United States Patent [19]

Kondo et al.

[11] Patent Number: 5,296,925
[45] Date of Patent: Mar. 22, 1994

[54] MOVEMENT VECTOR DETECTION DEVICE

[75] Inventors: Toshiaki Kondo, Tokyo; Masayoshi Sekine, Atsugi, both of Japan

[73] Assignee: Canon Kabushiki Kaisha, Tokyo, Japan

[21] Appl. No.: 967,569

[22] Filed: Oct. 27, 1992

Related U.S. Application Data

[63] Continuation of Ser. No. 691,807, Apr. 26, 1991, abandoned.

[30] Foreign Application Priority Data

| Apr. 27, 1990 [JP] Japan | 2-113953 |
| Apr. 27, 1990 [JP] Japan | 2-113954 |
| Apr. 27, 1990 [JP] Japan | 2-113955 |

[51] Int. Cl.$^5$ .............................................. H04N 7/18
[52] U.S. Cl. ................................................... 348/208
[58] Field of Search ........................................ 358/105

[56] References Cited

U.S. PATENT DOCUMENTS

| 3,890,462 | 6/1975 | Limb et al. | 358/105 |
| 4,240,109 | 12/1980 | Michael et al. | 358/105 |
| 4,873,573 | 10/1989 | Thomas et al. | 358/105 |

FOREIGN PATENT DOCUMENTS 60-46878 10/1985 Japan.

*Primary Examiner*—John K. Peng
*Attorney, Agent, or Firm*—Fitzpatrick, Cella, Harper & Scinto

[57] ABSTRACT

The present invention relates to a movement vector detection apparatus for obtaining the movement amount of an image from the density difference between frames and the spatial inclination. More particularly, the present invention relates to a movement vector detection apparatus having a first operation circuit for operating the movement vector in accordance with an estimation equation approximating an influence of the diagonal spatial inclination component, a second operation circuit for obtaining a signal denoting the amount of the diagonal spatial inclination component of a supplied image signal and a third operation circuit for averaging the output from the first operation circuit under a weight which corresponds to the output from the second operation circuit.

30 Claims, 9 Drawing Sheets

ACTUAL MOVEMENT VECTOR

MOVEMENT VECTOR DETECTION DEVICE

This application is a continuation of application Ser. No. 07/691,807 filed Apr. 26, 1991, now abandoned.

BACKGROUND OF THE INVENTION

1. Field of the Invention

The present invention relates to a movement vector detection device, and, more particularly to a movement vector detection device for use in an optical imaging apparatus such as a TV camera, an electronic camera, a video camera, or an industrial image measurement meter. In particular, the present invention relates to a movement vector detection device for use in an optical imaging apparatus possessing a vibration isolation function and a tracking function.

2. Related Background Art

A method of detecting a movement vector by processing an image signal is exemplified by a time spatial inclination method disclosed in Japanese Patent Publication No. 60-46878 and U.S. Pat. No. 3,890,462. Letting the image displacement amount in the direction x be $\alpha$ and the image displacement amount in the direction y be $\beta$, $\alpha$ and B are calculated from the following equations in accordance with the former method:

$$\alpha = \{\Sigma_B g_y'^2 (\Sigma_B g_x' d) - (\Sigma_B g_x' g_y')(\Sigma_B g_y' d)\} / \{\Sigma_B g_x'^2 \Sigma_B g_y'^2 - (\Sigma_B g_x' g_y')^2\}$$

$$\beta = \{\Sigma_B g_x'^2 (\Sigma_B g_y' d) - (\Sigma_B g_x' g_y')(\Sigma_B g_x' d)\} / \{\Sigma_B g_x'^2 \Sigma_B g_y'^2 - (\Sigma_B g_x' g_y')^2\} \quad (1)$$

In accordance with the latter method, they can be calculated by the following equations:

$$\alpha = \Sigma_B d.sign(g_x') / \Sigma_B |g_x'|$$

$$\beta = \Sigma_B d.sign(g_y') / \Sigma_B |g_y'| \quad (2)$$

where d is the density (level) difference at the same position between the images which are sequentially continued in time, that is, the time inclination values, $g_x'$ and $g_y'$ are respectively spatial inclination $\partial g(x,y)/\partial x$ in the x direction and spatial inclination $\partial g(x,y)/\partial y$ in the y direction when the image is expressed by g, $\Sigma_B$ means the sum calculation within a block which is a unit calculation region consisting of a plurality of pixels and sign ( ) is a function for transmitting the sign of $g_x'$ and $g_y'$.

Although the movement vector calculation by using Equation (1) has been used in accordance with the conventional inclination method, Equation (2) has attracted attention in actual time image processing in which high speed calculations are required.

However, a problem arises in Equation (2) in that the accuracy excessively deteriorates when $\Sigma_B g_x' g_y'$ is a large value because Equation (2) is obtained by simplifying Equation (1) in such a manner that the term $\Sigma_B g_x' g_y'$ of Equation (1) is approximated by 0.

SUMMARY OF THE INVENTION

A first object of the present invention is to provide a movement vector detection device which is capable of overcoming the above-described problems, in which an accuracy deterioration can be prevented and which is suitable for actual time processing.

A second object of the present invention is to provide a movement vector detection device capable of accurately detecting a movement vector while preventing an error by accurately detecting the spatial inclination of an image.

A third object of the present invention is to provide a movement vector detection device capable of preventing the deterioration of the detection accuracy due to the presence of a diagonal component in a spatial inclination of an image and accurately detecting a movement vector at high speed.

In order to achieve the above-described objects, according to a preferred embodiment of the present invention, there is disclosed a movement vector detection device for obtaining the movement amount of an image by using a spatial inclination in a frame, the movement vector detection device comprising: first operation means for operating a movement vector of a frame; a second operation means for operating a spatial inclination component in a diagonal direction of a supplied image signal; and a third operating means for weighted-averaging the output from the first operation means in accordance with the output from the second operation means.

A fourth object of the present invention is to provide an accurate and high speed movement vector detection device because a supplied image is filtered therein.

A fifth embodiment of the present invention is to provide an accurate movement vector detection device capable of preventing an error because an influence of a spatial inclination in a diagonal direction of an image is eliminated.

In order to achieve the above-described objects, according to a preferred embodiment of the present invention, there is disclosed a movement vector detection device for obtaining a movement amount of an image by using the spatial inclination in a frame, the movement vector detection device comprising: filter means for band-limiting a spatial inclination component in a diagonal direction of a supplied image signal and calculating means for calculating the movement vector in accordance with an estimation equation which approximates an influence of the diagonal spatial inclination component from the output from the filter means.

A sixth object of the present invention is to provide a movement vector detection device exhibiting a satisfactory reliability and accuracy by averaging the movement vectors for each of a plurality of detected blocks on a frame while weighting them in the most suitable manner after the movement vectors have been classified into predetermined patterns.

A seventh object of the present invention is to provide a movement vector detection device arranged in such a manner that the calculation of the movement vectors can be quickly completed by using an approximation and the errors are classified into patterns of the movement vectors in each of the detected blocks so as to be weighted before they are averaged, whereby the evaluation of the result of the estimation involving an error generated due to the approximated estimation equation can be lowered and thereby the movement vector can be reliably obtained.

An eighth embodiment of the present invention is to provide a movement vector detection device capable of preventing an error in an operation of detecting a movement in a direction in which there is no spatial inclination and an error in a detection operation due to the presence of a large diagonal-spatial inclination in a block, whereby the movement vectors can be accurately detected at high speed.

In order to achieve the above-described objects, according to a preferred embodiment of the present invention, there is disclosed a movement vector detection device for obtaining a movement amount of an image by using a spatial inclination in a frame, the movement vector detection device comprising: first operation means for operating a movement vector for each of plurality of predetermined blocks in a frame in accordance with a spatial inclination component; second operation means for obtaining a signal denoting the amount of the spatial inclination component in a diagonal direction of a supplied signal; classifying means for classifying each of the blocks into patterns which correspond to the result of a operation performed by the second operation means; and averaging means for averaging the movement vectors for each of the blocks obtained by the first operation means in accordance with a classification made by the classifying means.

A ninth object of the present invention is to provide an image compensating device and a video camera in which the above-described movement vector detection device is used so as to compensate the deviation of the image.

Other and further objects, features and advantages of the invention will be appear more fully from the following description.

BRIEF DESCRIPTION OF THE DRAWINGS

FIGS. 12 and 13 are block diagrams which illustrate embodiments in which the movement vector detection device according to the present invention is applied to an image deviation compensating device for a video camera or the like.

THE DETAILED DESCRIPTION OF THE PREFERRED EMBODIMENTS

Preferred embodiments of a movement vector detection device according to the present invention will now be described with reference to the drawings.

Figure 1:
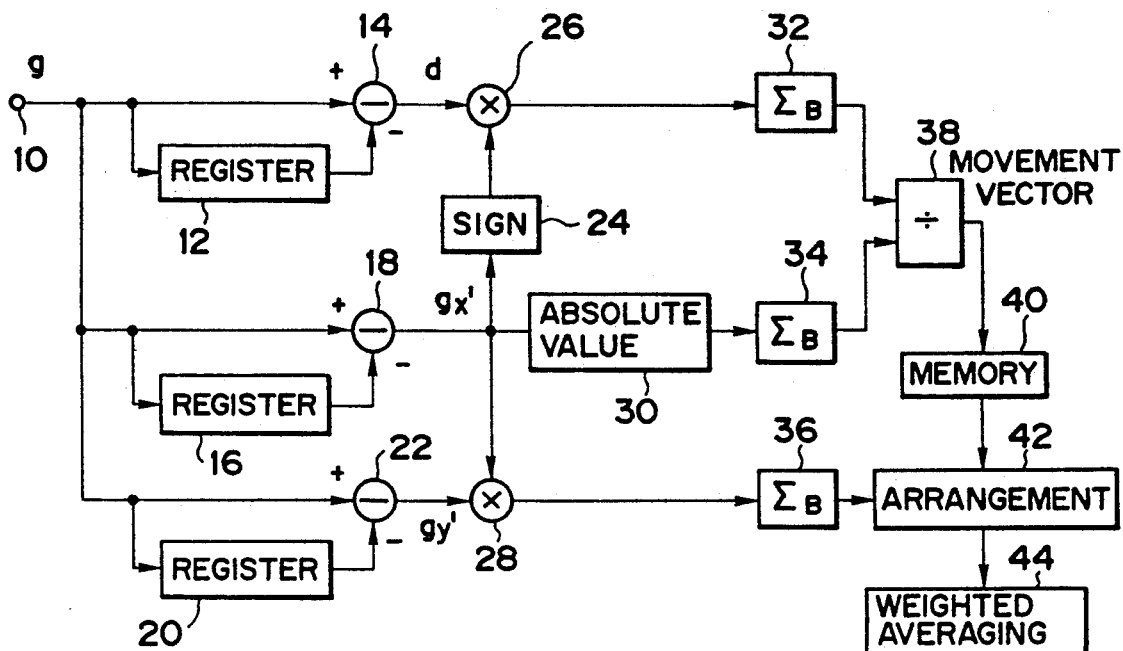
FIG. 1 is a structural block diagram which illustrates an embodiment of the present invention.

FIG. 1 is a block diagram which illustrates the structure of an embodiment of the present invention. Referring to FIG. 1, reference numeral 10 represents a terminal to which image signals are supplied and 12 represents a register for storing (that is, time delaying) the input signals for one field (or frame). Reference numeral 14 represents a subtracter for subtracting the output from the register 12 from an image signal supplied to the input terminal 10. Reference numeral 16 represents a register for storing (that is, time delaying) the input signals for a scanning time for a plurality of pixels which are necessary to calculate the spatial inclination of an image density distribution. Reference numeral 18 represents a subtracter for subtracting the output from the register 16 from the image signal supplied to the input terminal 10. Reference numeral 20 represents a register for storing (that is, time delaying) the image signals supplied to the input terminal 10 for a predetermined scanning period, so that the spatial inclination in a direction perpendicular to the spatial inclination that is obtained by the register 16 and the subtracter 18. Reference numeral 22 represents a subtracter for subtracting the output from the register 20 from the image signal supplied to the input terminal 10.

Reference numeral 24 represents a sign output circuit for transmitting a signal denoting the sign (positive, negative or zero) of the output from the subtracter 18. Reference numeral 26 represents a multiplier for multiplying the output from the subtracter 14 by the sign denoted by the signal transmitted from the sign output circuit 24. Reference numeral 28 represents a multiplier for multiplying the output from the subtracter 18 by the output from the subtracter 22. Reference numeral 30 represents an absolute value circuit for transmitting the absolute value of the output from the subtracter 18. Reference numerals 32, 34, 36 respectively represent summing circuits for cumulatively adding output data from the multiplier 26, the absolute value circuit 30 and the multiplier 28. Reference numeral 38 represents a divider for dividing the output from the summing circuit 32 by the output from the summing circuit 34. The output from the divider 38 is movement vector of corresponding blocks that are composed of a predetermined number of pixels of image data. Reference numeral 40 represents a memory for storing the movement vector for each of the blocks. Reference numeral 42 represents an arrangement circuit for arranging (sorting) the movement vectors for the blocks to be stored by the memory 40, the movement vectors being arranged in accordance with the magnitude of the outputs $\Sigma_{BG'x}\cdot g'_y$ from the summing circuit 36. Reference numeral 44 represents a weighted averaging circuit for averaging the movement vectors, which have been arranged by the arranging circuit 42, while properly weighting the movement vectors. Reference numeral 46 represents an output terminal through which the final movement vectors are transmitted.

Then, the operation will now be described with reference to FIG. 1. An image signal g supplied to the input terminal is divided into three passages. That is, the density difference (level difference) between two fields (or frames) which are time sequentially continued, that is, time inclination d, is calculated by the register 12 or the subtracter 14. Furthermore, the x-directional spatial inclination $g_x'$ in the former field (or frame) is calculated by the register 16 and the subtracter 18. Furthermore, the y-directional spatial inclination $g_y'$ in the former field (or frame) is calculated by the register 20 and the subtracter 22.

The x-directional spatial inclination $g_x'$ is supplied to the sign output circuit 24, the absolute value circuit 30 and the multiplier 28. The sign output circuit 24 transmits "+1" when the spatial inclination $g_x'$ is positive, "0" when the same is zero and "−1" when the same is negative. The absolute value circuit 30 transmits the absolute value of the spatial inclination $g_x'$. The multiplier 26 multiplies the time inclination d (the output from the subtracter 14) by the output from the sign output circuit 24. The summing circuits 32 and 34 respectively sum up the outputs from the multiplier 26 and the absolute value circuit 30 in a detection block composed of a predetermined number of pixels. That is, the summing circuit 32 calculates $\Sigma_B$ d.sign($g_x'$), while the summing circuit 34 calculates $\Sigma_B |g_x'|$. The divider 38 divides the output from the summing circuit 32 by the output from the summing circuit 34. The output from the divider 38 corresponds to $\alpha$ of the above-described Equation (2). As a result, the one-dimensional (horizontal or vertical) movement amount can be obtained.

The multiplier 28 multiplies the x-directional spatial inclination $g_x'$ by the y-directional spatial inclination $g_y'$. The summing circuit 36 sums up the outputs from the multiplier 28 in the same block as the summing circuits 32 and 34. The output $\Sigma_B g_x'.g_y'$ from the summing circuit 36 is the term approximated to zero in order to simplify Equation (1) to Equation (2). Therefore, the reliability or the certainty of the movement vector (the output from the divider 38) can be determined in accordance with the output from the summing circuit 36 by examining $\Sigma_B g_x'.g_y'$. That is, if the output from the summing circuit 36 is sufficiently approximated to zero, the result of the estimation made by using Equation (2) is reliable. On the contrary, if the same is a large value, the reliability is insufficient.

Therefore, the movement vector obtained by the divider 38 is temporarily stored in the memory 40 before it is arranged by the arrangement circuit 42 in accordance with the magnitude of $\Sigma_B g_x'.g_y'$. In the weighted averaging circuit 44, the averaging operation is performed in such a manner that the weight is increased in inverse proportion to $\Sigma_B g_x'.g_y'$. As a result, a signal denoting a further reliable image movement amount can be obtained from the output terminal 46.

Figure 2:
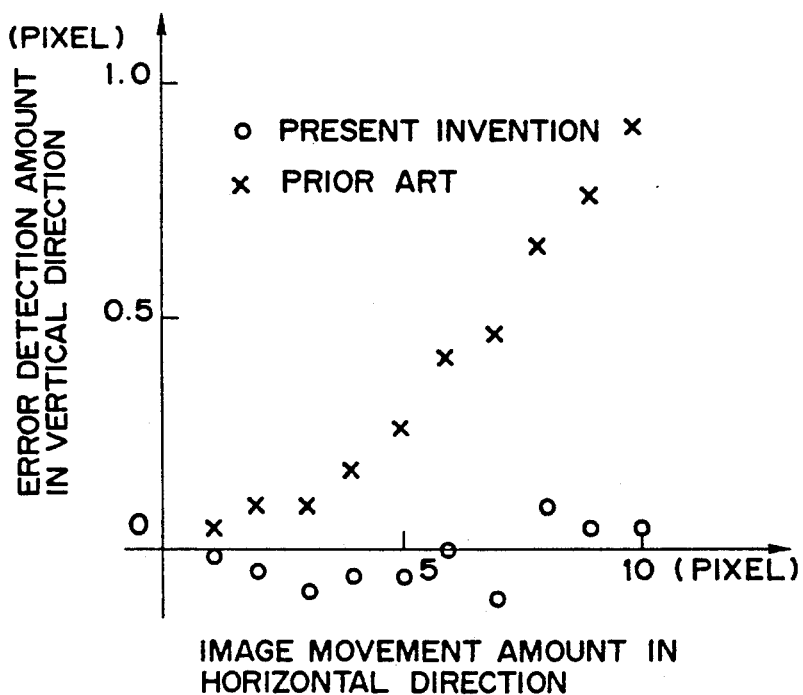
FIG. 2 is a comparison view which illustrate a result of an estimation made about the vertical movement amount with respect to the horizontal movement amount according to the present invention and the conventional structure.

Then, an effect of this embodiment will now be described with reference to FIG. 2. FIG. 2 is a graph which illustrates a result of a simulation performed in a case where this embodiment is applied to an image signal of horizontal x vertical x gradation =256×256×8 bits obtained from a solid imaging element camera. The axis of abscissa of the graph stands for the horizontal movement of the image, while the axis of ordinate of the same stands for the estimation amount generated in the vertical direction due to the horizontal movement of the image. The graph shows the result of the estimation about an output denoting the number of vertical pixels in which the image is moved when the image has been moved in the horizontal direction by 1 to 10 pixels. Since no vertical movement is made in actual fact, the result of the estimation in the vertical direction is, so to call, an erroneous detection amount. Referring to FIG. 2, symbol O denotes erroneous detection amount according to this embodiment and X denotes the erroneous detection amount obtained by a conventional inclination method in which Equation (2) is simply used.

The result expressed by the mark O shown in FIG. 2 and according to this embodiment is obtained by averaging $\Sigma_B g_x'.g_y'$ while increasing the weight in inverse proportion to its magnitude. As can be seen from FIG. 2, the erroneous detection amount can be significantly reduced according to the present invention. In this simulation, the number of the blocks in one frame is arranged to be 16 and the movement blocks obtained in the corresponding blocks are arranged in accordance with inverse proportion to the evaluation function $\Sigma_B g_x'.g_y'$. Furthermore, the averaging operation is performed in such a manner that the weight is decreased successively starting from 16 (16:15:14:, ... , :3:2:1) of a constant inclination.

According to the above-described embodiment, the weighting method, which is employed at the time of averaging the output results from the detection blocks, is arranged to use the sequential order in accordance with the magnitude of the evaluation function $\Sigma_B g_x'.g_y'$. Therefore, the necessity of storing the values of the evaluation function after a comparison with the evaluation function $\Sigma_B g_x'.g_y'$ for each of the blocks has been made can be eliminated. As a result, the algorithm can be simplified because only the relationship of the magnitude of the evaluation function is extracted.

Then, a weighting method characterized in that the magnitude of the evaluation function is considerably reflected will now be described.

That is, a method of weighting, which is performed in the weighted averaging circuit 44, may be employed which is arranged in such a manner that the movement vector obtained from the output from the divider 38 is multiplied by an inverse number of the evaluation function $\Sigma_B g_x'.g_y'$. As a result, the value of the evaluation function $\Sigma_B g_x'.g_y'$ is reflected, and the reliability of the movement vector can be further improved. In this case, the arranging circuit 42 can, of course, be omitted from the structure.

That is, letting the output results from the blocks be $\alpha_1, \alpha_2, \ldots, \alpha_m$, the weighted averaging equation in which the inverse numbers of the evaluation function are used as the weight can be expressed by the following equation:

$$\alpha = \frac{\alpha_1/\Sigma_{B1} g_x' \cdot g_y' + \alpha_2/\Sigma_{B2} g_x' \cdot g_y' \ldots + \alpha_m/\Sigma_{Bm} g_x' \cdot g_y'}{1/\Sigma_{B1} g_x' \cdot g_y' + 1/\Sigma_{B2} g_x' \cdot g_y' + \ldots + 1/\Sigma_{Bm} g_x' \cdot g_y'}$$

According to any one of the above-described embodiments, $\Sigma_B g_x'.g_y'$ is employed as the evaluation function. The evaluation function of $\Sigma_B g_x'.g_y'$ has a physical meaning of a spatial inclination component of the image in a diagonal direction. Therefore, the fact that the value of the above-described evaluation function is large means that the diagonal spatial inclination component is large. In this, the evaluation function expressing the diagonal spatial inclination component is provided as the sum where $|\Sigma_B g_x'|$ is the absolute value which is the sum of the horizontal spatial inclinations in a block and $|\Sigma_B g_y'|$ is the absolute value which is the sum of the vertical spatial inclinations in the block, that is, provided $|\Sigma_B g_x'| + |\Sigma_B g_y'|$.

Figure 3:
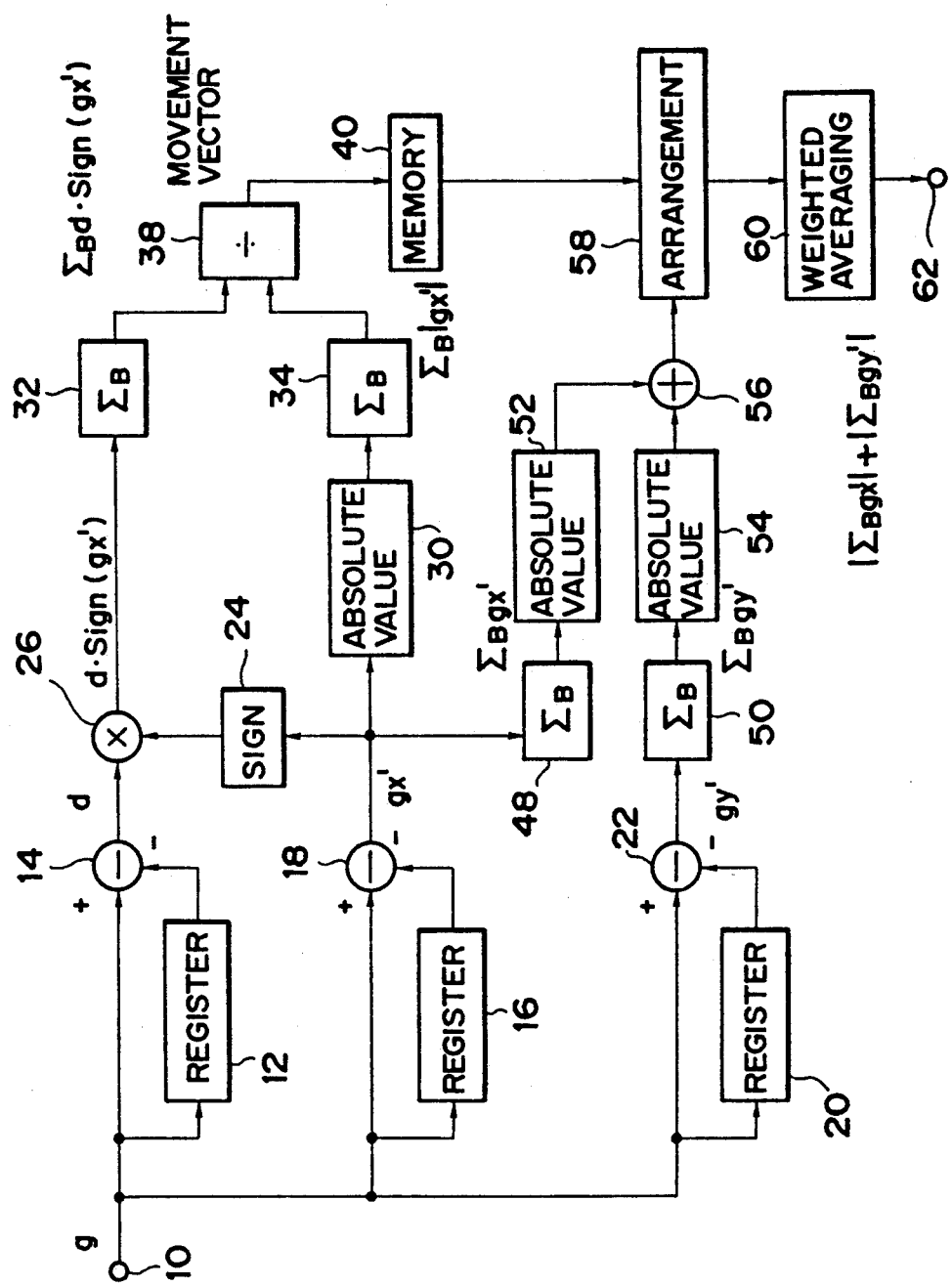
FIG. 3 is a structural block diagram which illustrates a third embodiment of the present invention.

FIG. 3 is a structural block diagram which illustrates this embodiment, where the same elements as those shown in FIG. 1 are given the same reference numerals. Then, the portions changed from those shown in FIG.

1 will be described. Reference numerals 48 and 50 represent the summing circuits arranged similarly to the summing circuits 32 and 34, the summing circuits 48 and 50 calculating the outputs from the subtracters 18 and 22 for each block. Reference numerals 52 and 54 represent absolute value circuits for calculating the absolute values of the summinq circuits 48 and 50. An adder 56 adds the outputs from the absolute value circuits 52 and 54. The arranging circuit 58 arranges the movement vectors in the memory 40 in accordance with their values. The weighted averaging circuit 60 weights the arranged order established by the arranging circuit 58 so as to average it, the result of the averaging operation being transmitted to an output terminal 62.

The adder 56 transmits the value of $|\Sigma_{BGx}'| + |\Sigma_{BGy}'|$ which denotes the diagonal inclination component amount. The weighted averaging circuit 60 rates the movement vector in a block, in which the diagonal component is large, with a low values, while it rates the movement vector in a block, in which the diagonal component is small, with a high value. However, if the value of $|\Sigma_{BGx}'|$ and that of $|\Sigma_{BGy}'|$ are excessively different, for example, if either one is 20 times or larger than the other one, it means, according to the embodiment shown in FIG. 3, that there is one directional spatial inclination in the horizontal direction or the vertical direction. The actual fact is that the diagonal component is small. Therefore, it is necessary to perform the weighting operation in consideration of the above-described fact in the weighted averaging circuit 60.

As will be easily understood from the above, the deterioration in the detection accuracy due to the diagonal component can be prevented. Therefore, the movement vector can be detected accurately and at high speed.

Then, a fourth embodiment of the present invention will now be described with reference to FIGS. 4 to 8, the fourth embodiment being arranged to be capable of preventing the deterioration of the accuracy in detecting the movement vector due to the diagonal spatial inclination of an image.

According to the fourth embodiment of the present invention, there is provided a movement vector detection device including a filter means for band limiting the diagonal spatial inclination component of a supplied image signal and operation means for operating the vector in accordance with an estimation equation which approximates the influence of the diagonal spatial inclination component. That is, the limiting operation of the diagonal spatial inclination component performed in the above-described embodiments is carried out by means of the filter means.

Then, the movement vector detection device according to this embodiment of the present invention will now be described with reference to the drawings.

Figure 4:
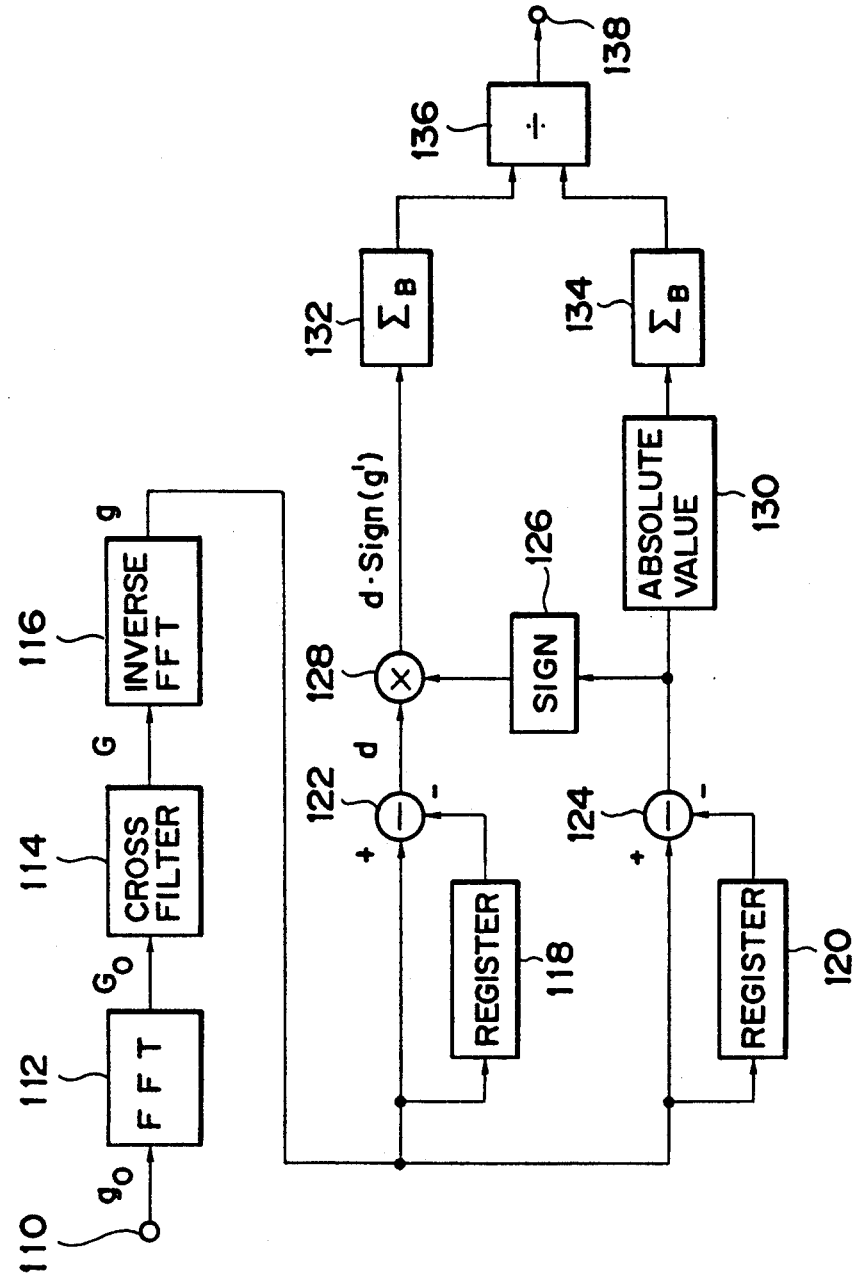
FIG. 4 is a structural block diagram which illustrates a fourth embodiment of the present invention.

FIG. 4 is a structural block diagram which illustrates the embodiment of the present invention. Reference numeral 110 represents an input terminal through which the image signal is supplied. Reference numeral 112 represents a two-dimensional Fourier transformation circuit and 114 represents a cross filter having cross shaped frequency characteristics. Reference numeral 116 represents a two-dimensional inverse Fourier transformation circuit and 118 represents a register for storing (that is, time delaying) the supplied signal for one field (or frame) period. Reference numeral 120 represents a register for storing (that is, time delaying) the input signal for a scanning time for a plurality of pixels which are necessary to calculate the spatial inclination of the image density distribution. Reference numerals 122 and 124 represent subtracters and 126 represents a sign output circuit for transmitting a signal denoting the sign (positive, negative or zero) of the input signal (the spatial inclination is denoted by the output from the subtracter 124). Reference numeral 128 represents a multiplier and 130 represents an absolute value circuit for transmitting the absolute value of the output from the subtracter 124. Reference numerals 132 and 134 represent summing circuits for cumulatively adding data in a specified block and 136 represents a divider for dividing the output from the summing circuit 132 by the output from the summing circuit 134. Reference numeral 138 represents an output terminal through which a signal denoting the horizontal or vertical movement amount of an image is transmitted.

Then, the operation will now be described with reference to FIG. 4. An image signal $g_0$ supplied to the input terminal 110 is subjected to the two-dimensional Fourier transformation by the Fourier transformation circuit 112 so as to generate a signal $G_0$. The output $G_0$ from the Fourier transformation circuit 112 is supplied to the cross filter 114 so that its horizontal and vertical components are transmitted and the component of the inclination in the diagonal direction is removed. The output from the cross filter 114 is subjected to the inverse Fourier transformation by the inverse Fourier transformation circuit 116. That is, an output g from the inverse Fourier transformation circuit 116 is an image signal formed by sufficiently removing the diagonal inclination component from the image signal supplied to the input terminal 110.

The output g from the inverse Fourier transformation circuit 116 is divided into two passages In one passage, the density difference (level difference) between two fields (frames), which are sequentially continued in timed, that is the time inclination d, is calculated by the register 118 and the subtracter 122. On the other hand, in the other passage, the spatial inclination g' between a predetermined number of pixels in the present frame (field or frame) is calculated by the register 120 and the subtracter 124.

The thus obtained spatial inclination g' is supplied to the sign output circuit 126 and the absolute value circuit 130. The sign output circuit 126 transmits "+1" when the the spatial inclination g' is positive, "0" when the same is zero and "−1" when the same is negative. The absolute value circuit 130 transmits the absolute value of the spatial inclination g'. The multiplier 128 multiplies the time inclination d (the output from the subtracter 122) by the output from the sign output circuit 126 so as to transmit d.sign(g'). The summing circuits 132 and 134 respectively sum up the outputs from the multiplier 128 and the absolute value circuit 134 in blocks respectively composed of a predetermined number of pixels. That is, the summing circuit 132 calculates $\Sigma_B$ d.sign(g'), while the summing circuit 134 calculates $\Sigma_B|g'|$. The divider 136 divides the output from the summing circuit 132 by the output from the summing circuit 134, that is, $\Sigma_B$d.sign(g')/$\Sigma_B|g'|$ is calculated. Therefore, in a case where the horizontal spatial inclination $g_x'$ is obtained by the register 120 and the subtracter 124, the horizontal movement amount $\alpha$ can be obtained from the output terminal 138. In a case where the vertical spatial inclination $g_y'$ is obtained by the register 120 and the subtracter 124, the vertical movement amount $\beta$ can be obtained from the output terminal 138.

Figure 5:
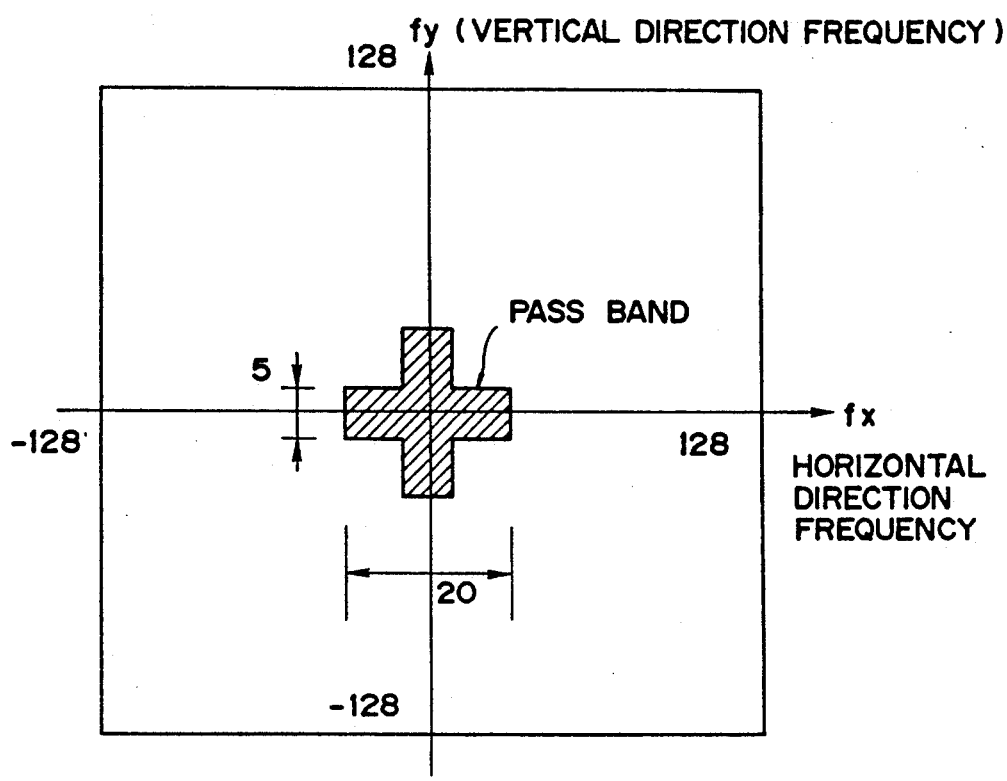
FIG. 5 illustrates the frequency characteristics of a cross filter 14.
Figure 6:
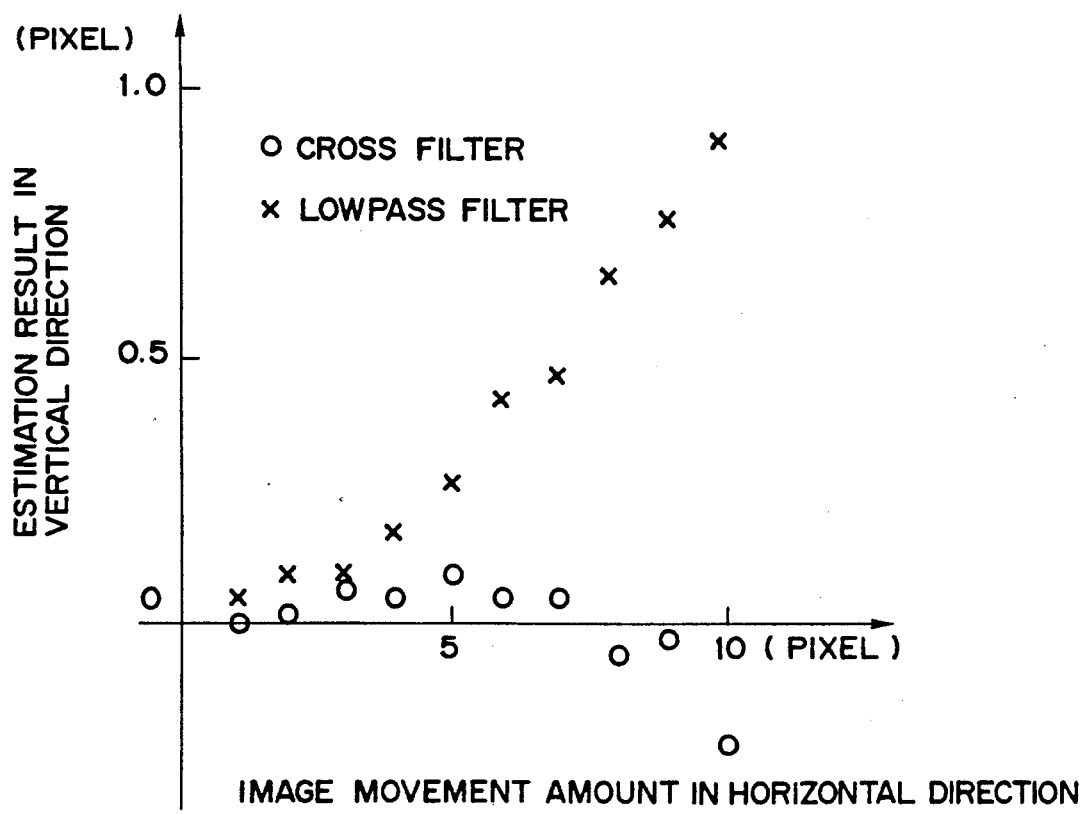
FIG. 6 illustrates a result of a comparison made about the result of an estimation of the vertical movement amount with respect to the horizontal movement amount realized by the cross filter with that realized by a low-pass filter.

Then, the operation and effect of the cross filter 114 will now be described with reference to FIGS. 5 and 6. FIG. 5 illustrates a pass band characteristic of the cross filter 114 designed for treating an image of $256\times256\times1$ byte taken from a video camera, the filter 114 having a size of $256\times256$ which is the same as that of the image. The input image $g_0$ is transformed into $G_0$ by the two-dimensional Fourier transformation being before filtered by the cross filter 114 so that an image spectrum G is obtained. The spectrum G is then again subjected to the two-dimensional inverse Fourier transformation so as to be an image g which has been transformed into an actual space. As a result, the movement amount of the image is calculated. The horizontal movement amount was estimated by using the above-described Equation (2) for an actual time treatment in a case where the cross filter having the above-described characteristics was used and that was estimated in a case where a simple low-pass filter of $20\times20$ was used. FIG. 6 illustrates the result of the estimation of the vertical image movement amount with respect to its horizontal movement amount when the image has been moved by 1 to 10 pixels in only the horizontal direction. Referring to FIG. 6, symbol O denotes the result of the estimation according to this embodiment in which the cross filter is used, while X denotes the result of the estimation in a case where the low-pass filter is used.

Since the image is moved in only the horizontal direction in the above-described simulation, the result of the estimation of the vertical movement amount is to be zero ideally. However, the result of the estimation of the vertical movement amount is not made to be zero due to the influence of the approximation of Equation (2). In a case where the low-pass filter is used, the result of error in the estimation increases in proportion to the image movement amount. However, according to this embodiment in which the cross filter is used, the image movement amount can be significantly reduced with respect to the result in the case of the low-pass filter although the result of the estimation of the vertical movement amount cannot be made to be exactly zero. Furthermore, the vertical component, that is, the error can be made smaller even if the image movement amount has been enlarged.

That is, in the case where a low-pass filter is used, since the diagonal component $\Sigma_{BG_x'} \cdot \Sigma_{BG_y'}$ is simply made to be "0" in the calculation performed in accordance with Equation (2), the accuracy is excessively deteriorated if the diagonal inclination component is large.

Referring to FIG. 6, the results plotted by X denote the detected movement amount of the image in the vertical direction in a case where the spectrum G of the image is multiplied by a $20\times20$ square low-pass filter and Equation (2) is applied to the image which has been transformed into an actual space by the two-dimensional Fourier transformation. As can be clearly seen from the above, as the actual movement amount of the image is increased the output in the vertical direction is enlarged. This means that the error is enlarged.

On the other hand, the results plotted by O denote the detected movement amount of the image in the vertical direction in a case of the present invention in which the spectrum G (fx, fy) of the image is multiplied by the above-described cross filter and Equation (2) is applied to the image which has been transformed into an actual space by the two-dimensional Fourier transformation. The results plotted by O show an excellent result of preventing the increase in the vertical component, that is, the error, in comparison to the results plotted by X.

Figure 7:
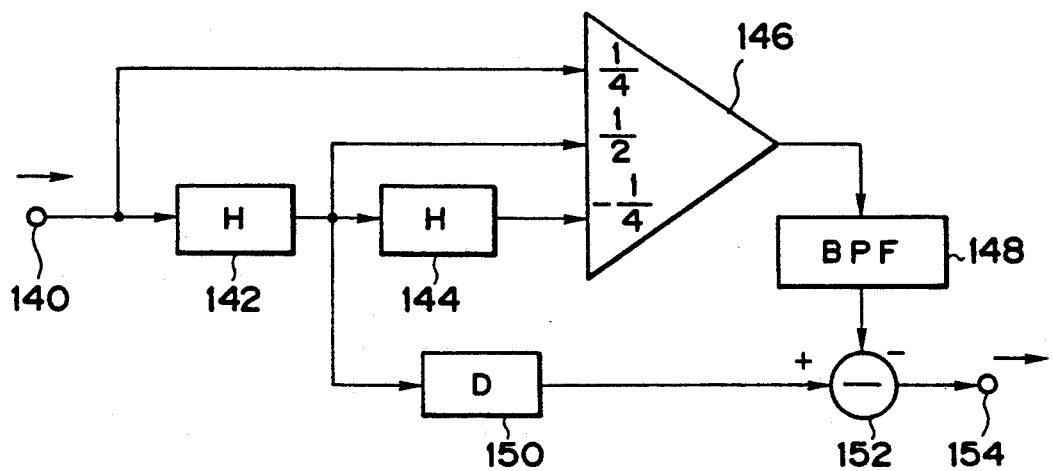
FIG. 7 is a circuit diagram which illustrates a filter for limiting the diagonal component in a spatial region.

Although the band of the diagonal inclination component is limited by the frequency region according to the embodiment shown in FIG. 4, it may be limited by the spatial region. FIG. 7 illustrates an example of the structure of the circuit for use in a filter designed to limit it by the spatial region. FIG. 7 illustrates an example of the structure of a filter circuit for removing the diagonal inclination component of an analog TV signal. Referring to FIG. 7, reference numeral 140 represents an input terminal through which an analog TV signal is supplied. Reference numerals 142 and 144 represent delay circuits for one horizontal scanning period. Reference numeral 146 represents an addition circuit for adding a signal supplied to the input terminal 140, a signal which has been delayed by one horizontal scanning period by the delay circuits 142 and a signal which has been delayed by two horizontal scanning periods by the delay circuits 142 and 144, the above-described signals being respectively applied with weights of $-\frac{1}{4}$, $\frac{1}{2}$ and $-\frac{1}{4}$. Reference numeral 148 represents a band pass filter (BPF) and 150 represents a delay circuit for adjusting the degree of the delay of the BPF 148. Reference numeral 152 represents a subtracter for subtracting the output from the BPF 148 from the output from the delay circuit 150. Reference numeral 154 represents an output terminal.

In a case where the polarity of each of the TV signals on the upper and lower scanning lines with respect to an optional scanning line have been inverted, the output from the BPF 148 and that from the delay circuit 150 become the same. Therefore, the output from the output terminal 154 becomes zero in the pass band region for the BPF 148, causing the diagonal inclination component to be removed.

Another method is available which is arranged in such a manner that the mask for an image is subjected to a convolution calculation in a spatial region, whereby the band of the diagonal inclination component is limited. Since this method is mathematically equivalent to the process shown in FIG. 4, the Fourier transformation and the inverse Fourier transformation can be omitted from the structure. Therefore, the processing speed can be raised and the structure of the hardware can be simplified.

Figure 8:
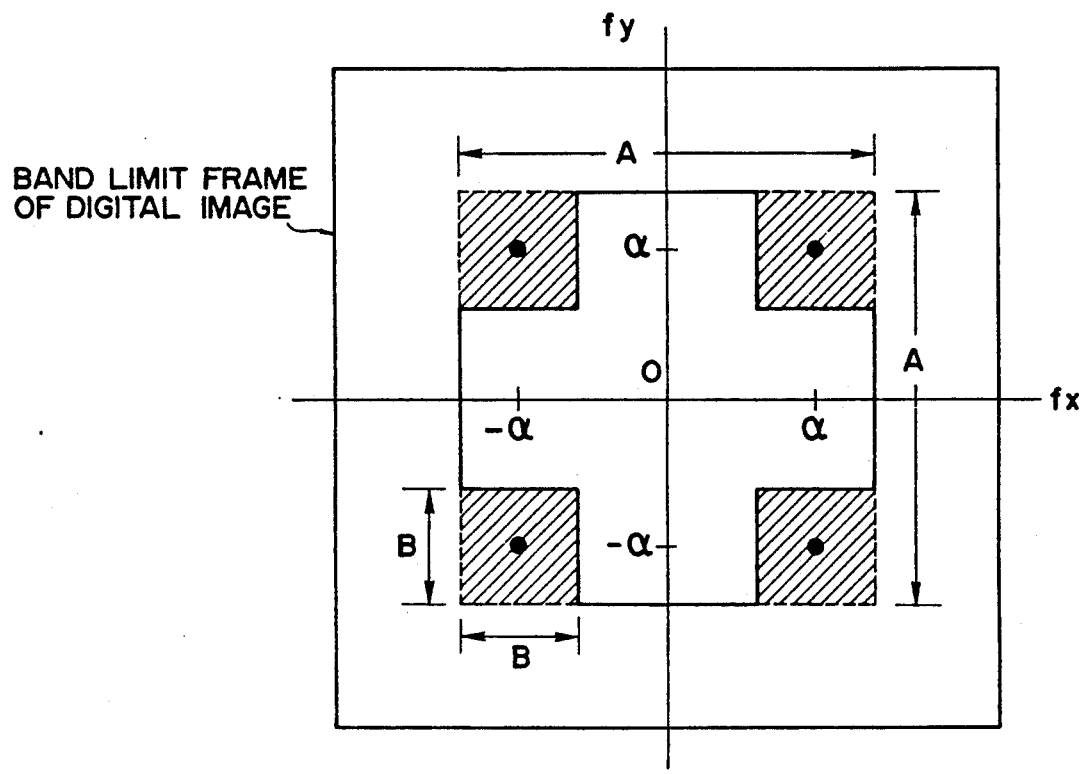
FIG. 8 illustrates a method of designing a convolution mask for band-limiting the diagonal component.

Referring to FIG. 8, a method of designing the mask in a spatial region will now be described. The design procedure is arranged as follows: first, a function denoting a low-pass filter (an A X A square around the origin shown in FIG. 8) including a cross filter which is desired to be designed in the frequency region is determined. Then, a function denoting the four corners of the low-pass filter is determined. Subsequently, the thus determined two functions are subjected to a subtraction. As a result, a function having a cross shaped frequency characteristic in the frequency region can be obtained approximately. The function obtained due to the above-described subtraction is subjected to a Fourier transformation, resulting in a convolution mask in a spatial region to be obtained.

Then, a description will now be made by using a specific function of the convolution mask in the spatial region. Referring to FIG. 8, a low-pass filter a side of which is A is approximated by the following equation:

$$F_1 = 4/A^2 \, \text{sinc}\,(2/A.fx).\text{sinc}\,(2/A.fy)$$

In this case, the width, with which the sinc function first becomes 0 when viewed from a low frequency side, is made coincide with A. Now, let the center coordinates of a hatched section of FIG. 8 be ($\pm a$, $\pm a$) and this is approximated by the following equation.

$$F_2 = \{\text{sinc}(2/B.fx-a) + \text{sinc}\,(2/B.fx+a)\} \times \{\text{sinc}(2/B.fy-a) + \text{sinc}\,(2/B.fy+a)\} \times 4/B^2$$

Transforming this, the following equation can be obtained:

$$F_2 = [\text{sinc}\,(2/B.fx)*\{\delta(fx-a)+\delta(fx+a)\}] \times [\text{sinc}\,(2/B.fy)*\{\delta(fy-a)+\delta(fy+a)\}] \times 4/B^2$$

where * is an operator for the convolution operation. Also in this case, the width, with which the sinc function first becomes 0 when viewed from the centers of four hatched sections, is made to coincide with B shown in FIG. 8. Subtracting $F_2$ from $F_1$, the following result can be obtained.

$$F = F_1 - F_2 = \frac{4}{A^2}\,\text{sinc}\left(\frac{2}{A}\cdot fx\right)\cdot\text{sinc}\left(\frac{2}{A}\cdot fy\right) -$$

$$\frac{4}{B^2}\left[\text{sinc}\left(\frac{2}{B}\cdot fx\right)*\{\delta(fx-a)+\delta(fx+a)\}\right] \times$$

$$\left[\text{sinc}\left(\frac{2}{B}\cdot fy\right)*\{\delta(fy-a)+\delta(fy+a)\}\right]$$

Letting the inverse Fourier transformation of F be f, the following result can be obtained.

$$f = \text{rect}(Ax/2)\cdot\text{rect}(Ay/2) - \text{rect}(Bx/2)\,\{\exp(-j2\pi xa) + \exp(j2\pi xa)\}\,\text{rect}(By/2)\{\exp(-j2\pi ya) + \exp(j2\pi ya)\}$$

$$= \text{rect}(Ax/2)\cdot\text{rect}(Ay/2) - 2\cos(2\pi xa)\cdot\cos(2\pi ya) \times \text{rect}(Bx/2)\cdot\text{rect}(By/2)$$

Since $a = (A-B)/2$, $a$ can be eliminated and the following result is obtained:

$$f = \text{rect}(Ax/2).\text{rect}(Ay/2) - 2\cos(2\pi x(A-B)/2).\cos(2\pi y(A-B)/2) \times \text{rect}(Bx/2).\text{rect}(By/2)$$

By substituting desired A and B into the above-described equation, a desired convolution mask in a spatial region can be designed.

As will be easily understood from the above, the deterioration in the detection accuracy due to the diagonal component can be prevented according to the present invention. As a result, the movement vector can be accurately detected at high speed.

A seventh embodiment of the present invention will now be described. As described above, the displacement of an image can be given from Equation (2) in such a manner that the x-directional movement amount is obtained from the x-directional spatial inclination and the density difference and the y-directional movement amount is obtained from the y-directional spatial inclination and the density difference. Therefore, the influence of the spatial inclinations in the relative directions of x and y is not taken into consideration. As a result, the two-dimensional image movement cannot be satisfactorily treated by the above-described method.

Figure 10:
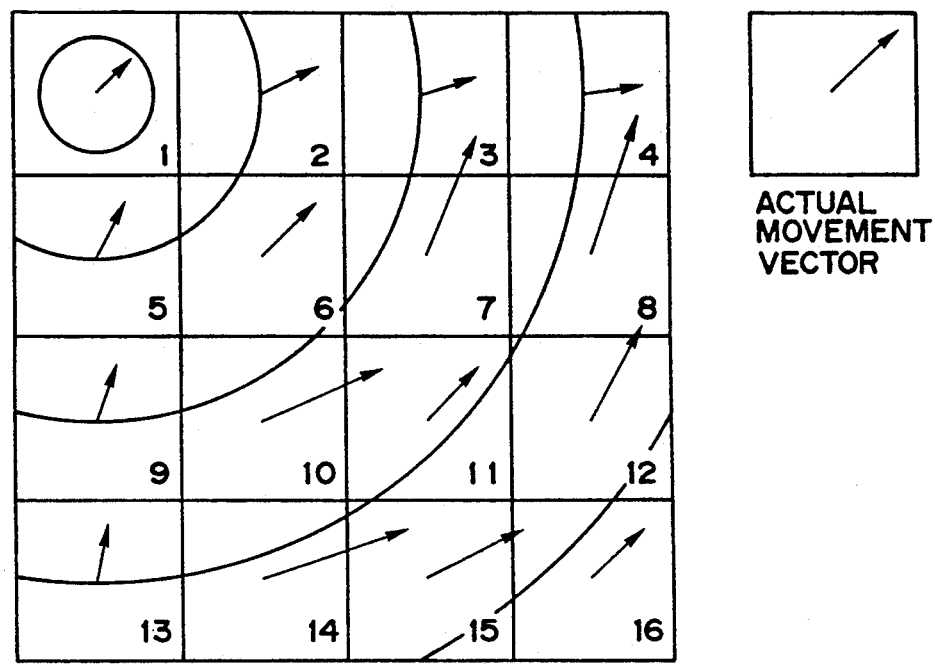
FIG. 10 illustrates a result of a simulation made in according with the conventional structure.

This embodiments will now be further specifically described with reference to FIG. 10. FIG. 10 illustrates the result of a detection made by the conventional method in a case where an image having a diagonal (right down) direction is sectioned into 16 blocks and they are moved in an upper right direction as shown in the upper portion of FIG. 10, the result being illustrated with the movement vector for each block. Circular arcs shown in FIG. 10 are constant density lines.

In blocks #6, #11 and #16, strong diagonal spatial inclination components are shown. However, the time spatial inclination method is premised on that "there is no large time spatial inclination in the diagonal direction in a block". Since the above-described results do not meet this premise, correct estimations are not made in both the directions x and y.

In blocks #2, #3 and #4, although the x-directional movement is correctly estimated, the y-directional movement is not correctly estimated. In blocks #5, #9 and #13 contrarily to the blocks #2, #3 and #4, the y-directional movement is correctly estimated but the x-directional movement is not estimated correctly. The reason for this lies in that "the movement in a direction in which there is no spatial inclination cannot be estimated" according to the time spatial inclination method. In addition, in blocks #7, #8, #10 and #14, a critical error is generated in a direction in which the spatial inclination is small due to the same principle of the time spatial inclination method.

Accordingly, an object of the present invention is to provide a high speed and accurate movement vector detection device which can overcome the above-described problems and which can be adapted to the actual time process. In order to achieve this object, there is provided a movement vector detection device for obtaining the image movement amount from the density difference between frames and the spatial inclination in a frame, the movement vector detection device comprising: first operation means for operating the movement vector for each block in accordance with an estimation equation which approximates the influence of a diagonal spatial inclination component; second operation means for obtaining a signal denoting the diagonal spatial inclination component amount of an input image signal; classifying means for classifying the blocks into patterns which correspond to the result of the operation performed by the second operation means; and averaging means for averaging the movement vectors of the corresponding blocks obtained by the first operation means by the weight which is determined in accordance with the classification made by the classifying means.

As a result of the operation of the first operation means, the movement vector is basically obtained from an approximated estimation equation. Therefore, the process can be completed at high speed. Furthermore, since the blocks are classified in consideration of the diagonal spatial inclination component amount by the second operation means and the classifying means and the averaging means performs the weighted averaging operation in accordance with the thus made classification, the evaluation of the estimated result involving an error generated due to the approximated estimation equation can be lowered. Therefore, the movement vector can be reliably obtained.

Specifically, the distribution of the spatial inclination is classified into a plurality of simple patterns. Furthermore, the result of the estimation of the movement amount in a direction in which each of the blocks can be easily detected is raised, while that in a direction in which they cannot be correctly detected is lowered. Therefore, the error generated when the principle or the assumption of the inclination method cannot be met can be prevented.

Then, this embodiment will now be described with reference to the drawings.

Figure 9:
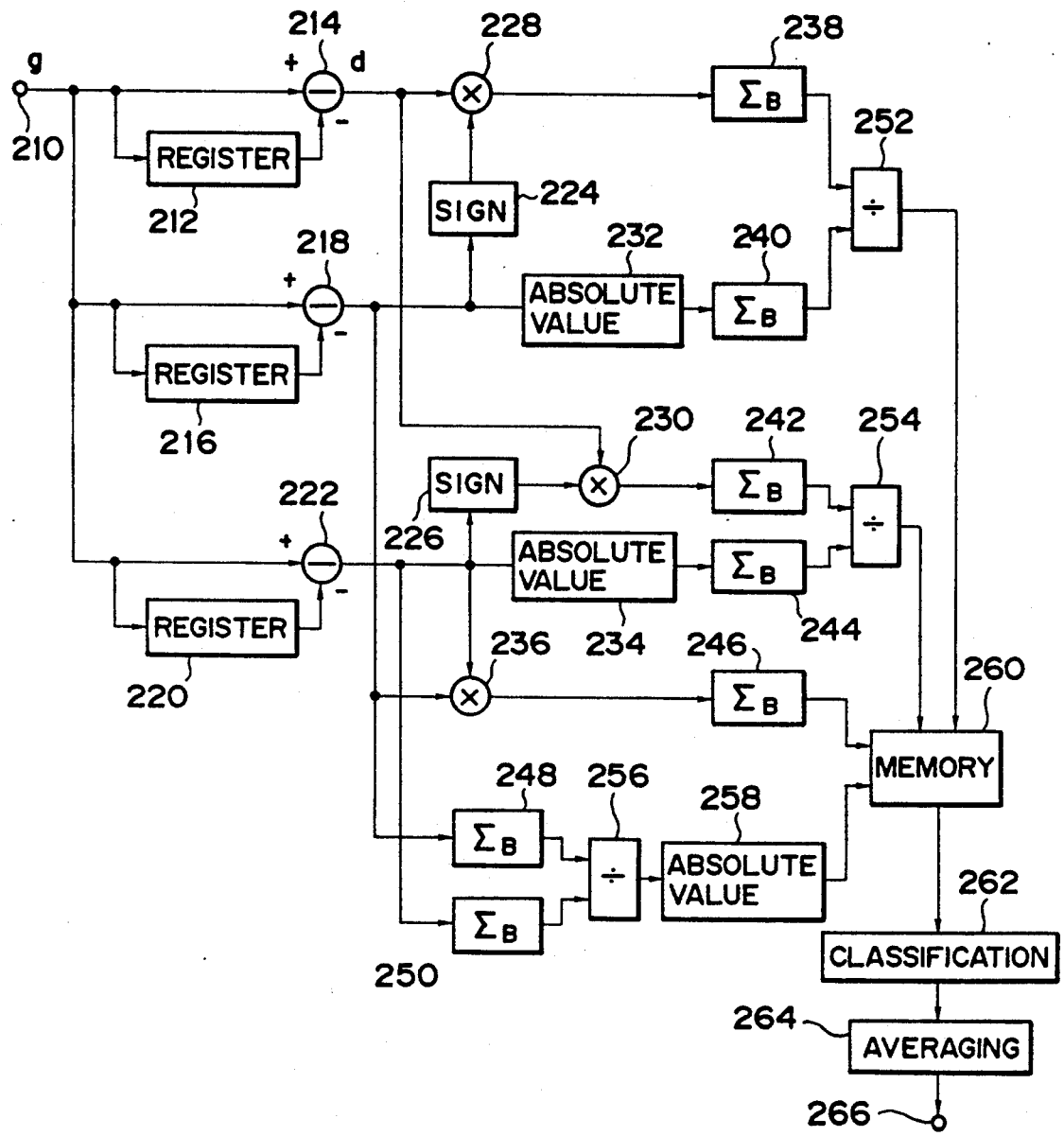
FIG. 9 is a structural block diagram which illustrates an embodiment of the present invention.

FIG. 9 is a structural block diagram which illustrates an embodiment of the present invention in which the structure of the present invention is applied to a frame shake preventing apparatus for a TV camera or video camera. Referring to FIG. 9, reference numeral 210 represents an input terminal through which an image signal is supplied. Reference numeral 212 represents a register for storing (that is, time delaying) the input signals for one field (or frame). Reference numeral 214 represents a subtracter for subtracting the output from the register 212 from an image signal supplied to the input terminal 210. Reference numeral 216 represents a register for storing (that is, time delaying) the input signals for a scanning time for a plurality of pixels which are necessary to calculate the x-directional spatial inclination of an image density distribution. Reference numeral 218 represents a subtracter for subtracting the output from the register 216 from the image signal supplied to the input terminal 210. Reference numeral 220 represents a register for storing (that is, time delaying) the image signals supplied to the input terminal 210 for a predetermined scanning period, so that the y-directional spatial inclination is obtained. Reference numeral 222 represents a subtracter for subtracting the output from the register 220 from the image signal supplied to the input terminal 210. The output from the subtracter 214 is the density inclination d, the output from the subtracter 218 is the x-directional spatial inclination $g_x'$ and the output from the subtracter 222 is the y-directional spatial inclination $g_y'$.

Reference numerals 224 and 226 respectively represent sign output circuits for transmitting a signal denoting the sign (positive, negative or zero) of the outputs from the subtracters 218 and 222. Reference numerals 228 and 230 respectively represent multipliers for multiplying the outputs from the sign output circuits 224 and 226 by the output (the density inclination d) from the subtracter 214. Reference numerals 232 and 234 respectively represent absolute value circuits for transmitting the absolute values of the outputs from the subtracters 218 and 222. Reference numerals 236 represents a multiplier for multiplying the output $g_x'$ from the subtracter 218 by the output $g_y'$ from the subtracter 222. Reference numerals 238, 240, 242, 244, 246, 248 and 250 are respectively summing circuits for summing up the output data from the multiplier 228, the absolute value circuit 232, the multiplier 230, the absolute value circuit 234, the multiplier 236, the subtracter 218 and the subtracter 222. Reference numeral 252 represents a divider for dividing the output from the summing circuit 238 by the output from the summing circuit 240. Reference numeral 254 represents a divider for dividing the output from the summing circuit 242 by the output from the summing circuit 244. Reference numeral 256 represents a divider for dividing the output from the summing circuit 248 by the output from the summing circuit 250. The output from the divider 252 shows the movement amount in the x direction, while the output from the divider 254 represents the movement amount in the y direction. Reference numeral 258 represents an absolute value circuit for transmitting the absolute value of the output from the divider 256.

Reference numeral 260 represents a memory for storing the movement amounts transmitted from the dividers 252 and 254 and the spatial inclination information transmitted from the absolute value circuit 258. Reference numeral 262 represents a pattern classifying circuit for classifying, as described later, the blocks into a plurality of spatial inclination patterns in accordance with the spatial inclination information. Reference numeral 264 represents an averaging circuit for averaging the blocks, which have been classified by the classifying circuit 262, while properly weighting them. Reference numeral 266 represents an output terminal for transmitting the movement vector, which is the result of the detection.

Then, the operation will now be described with reference to FIG. 9. The register 212 and the subtracter 214 calculate the density difference in the two fields (or frames) which are sequentially continued in time, that is, the time inclination d from the image signal g supplied to the input terminal 210. The register 216 and the subtracter 218 calculate the x-directional spatial inclination $g_x'$ in the former field (or frame). The register 220 and the subtracter 222 calculate the y-directional spatial inclination $g_y'$ in the former field (or frame).

The sign output circuit 224 transmits "+1" when the output $g_x'$ from the subtracter 218 is positive, "0" when the same is zero and "−1" when the same is negative. The absolute value circuit 230 transmits the absolute value of the spatial inclination $g_x$. The multiplier 228 multiplies the output d from the subtracter 214 by the output from the sign output circuit 224. Similarly, the sign output circuit 226 transmits a signal denoting the output $g_y'$ from the subtracter 222. The absolute value circuit 234 transmits the absolute value of the spatial inclination $g_y'$. The multiplier 230 multiplies the output d from the subtracter 214 by the output from the sign output circuit 226. The summing circuits 238, 240, 242 and 244 respectively sum up the output from the multiplier 228, that from the absolute value circuit 232, that of the multiplier 230 and that of the absolute value circuit 234 in a block composed of a predetermined number of pixels. That is, the summing circuit 238 calculates $\Sigma_B d.\text{sign}(g_x')$, the summing circuit 240 calculates $\Sigma_B d.|g_x'|$, the summing circuit 242 calculates $\Sigma_B d.\text{sign}(g_y')$ and the summing circuit 244 calculates $\Sigma_B |g_y'|$. The divider 252 divides the output from the summing circuit 238 by the output from the summing circuit 240. The divider 254 divides the output from the summing circuit 242 by the output from the summing circuit 244. The outputs from the dividers 252 and 254 respectively correspond to $\alpha$ and $\beta$ in the above-described equation. The outputs from the dividers 252 and 254 are temporarily stored in the memory 260.

The multiplier 236 multiplies the output $g_x'$ from the subtracter 218 by the output $g_y'$ from the subtracter 222. The summing circuit 246 sums up the outputs from the multiplier 236 in a predetermined block. The summing circuits 248 and 250 respectively sum up the outputs $g_x'$ and $g_y'$ from the subtracters 218 and 222. The divider 256 divides the output from the summing circuit 248 by the output from the summing circuit 250. The absolute value circuit 258 outputs the absolute value of the output from the divider 256. That is, the absolute value 258 outputs $|\Sigma_{BGx}'/\Sigma_{BGy}'|$. The output $\Sigma_{BGx}'.g_y'$ from the summing circuit 246 and the output from the absolute value circuit 258 are supplied to the memory 260.

Figure 11:
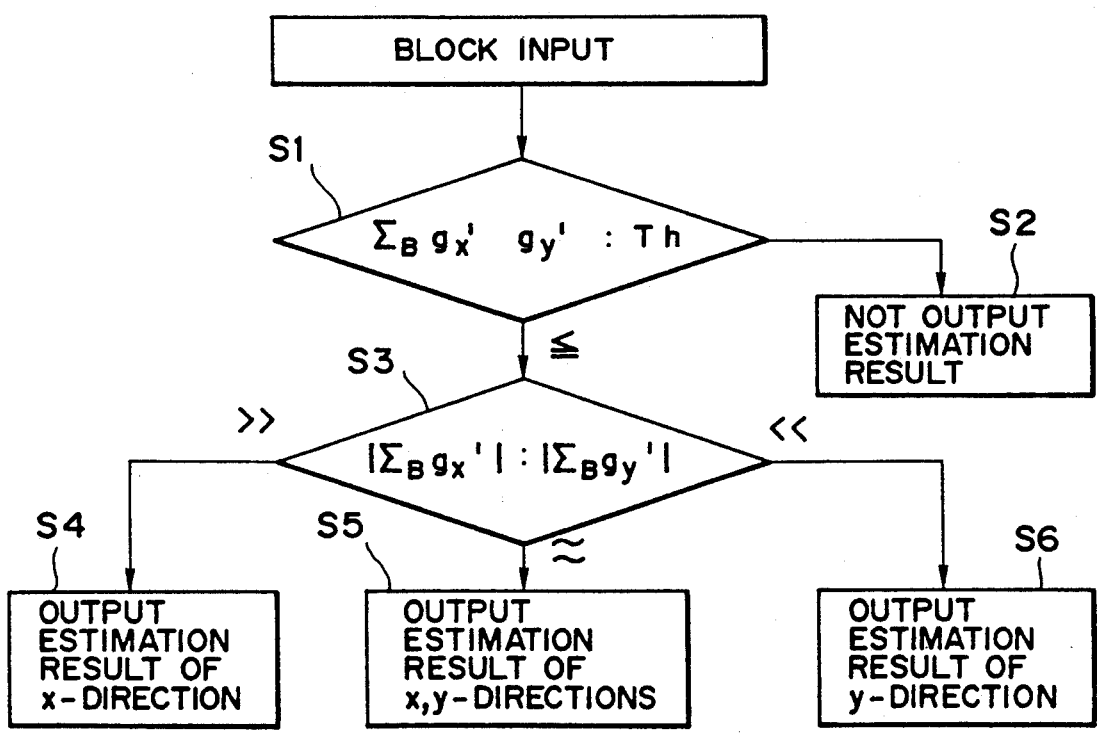
FIG. 11 is a flow chart for a pattern classification operation performed according to the embodiment of the present invention.

The pattern classifying circuit 262 classifies each of the blocks into a plurality of simple patterns from information about $|\Sigma_{BGx}'/\Sigma_{BGy}'|$ and $\Sigma_{BGx}'.g_y'$ stored in the memory 260. The flow chart about this classifying operation is shown in FIG. 11. That is, if $\Sigma_{BGx}'.g_y'$, which serves as a parameter, in a certain block is larger than predetermined threshold Th (S1), a determination is made that the diagonal spatial inclination component is large. In this case, the result of the output from the subject block is omitted (S2). At this time, it may be weighted in accordance with $\Sigma_{BGx}'.g_y'$ similarly to the above-described embodiments in place of simply omitting it. Then, if a determination is made that $|\Sigma_{BGx}'|$ is considerably larger than $|\Sigma_{BGy}'|$ from the result of $|\Sigma_{BGx}'/\Sigma_{BGy}'|$, the estimation result $\alpha$ in the direction x is evaluated high, the estimation result $\beta$ in the direction y is evaluated low (S4). If a determination is made that $|\Sigma_{BGx}'|$ is substantially the same as $|\Sigma_{BGy}'|$, both the estimation resuls $\alpha$ and $\beta$ in the directions x and y are determined to be reliable and evaluated high (S5). If $|\Sigma_{BGx}'|$ is sufficiently smaller than $|\Sigma_{BGy}'|$, the estimation result $\beta$ in the direction y is evaluated high and the estimation result $\alpha$ in the direction x is evaluated low (S6).

As described above, each of the blocks is classified and weighted in accordance with the result of the classification in the averaging circuit 264 so as to average the result of the estimation of each of the blocks. The averaged results are transmitted from the output terminal 266.

As a result, the influence of the detected block which possesses steep diagonal spatial inclination and thereby involves a large error can be eliminated. Therefore, the movement vector can be detected accurately.

As can be easily understood from the above, according to the present invention, the error in the detected result in the movement in a direction in which there is not spatial inclination can be prevented. Furthermore, the error in the detected result generated due to the fact that there is a large diagonal spatial inclination in a block can also be prevented. Therefore, the movement vector can accurate detected at high speed.

Figure 12:
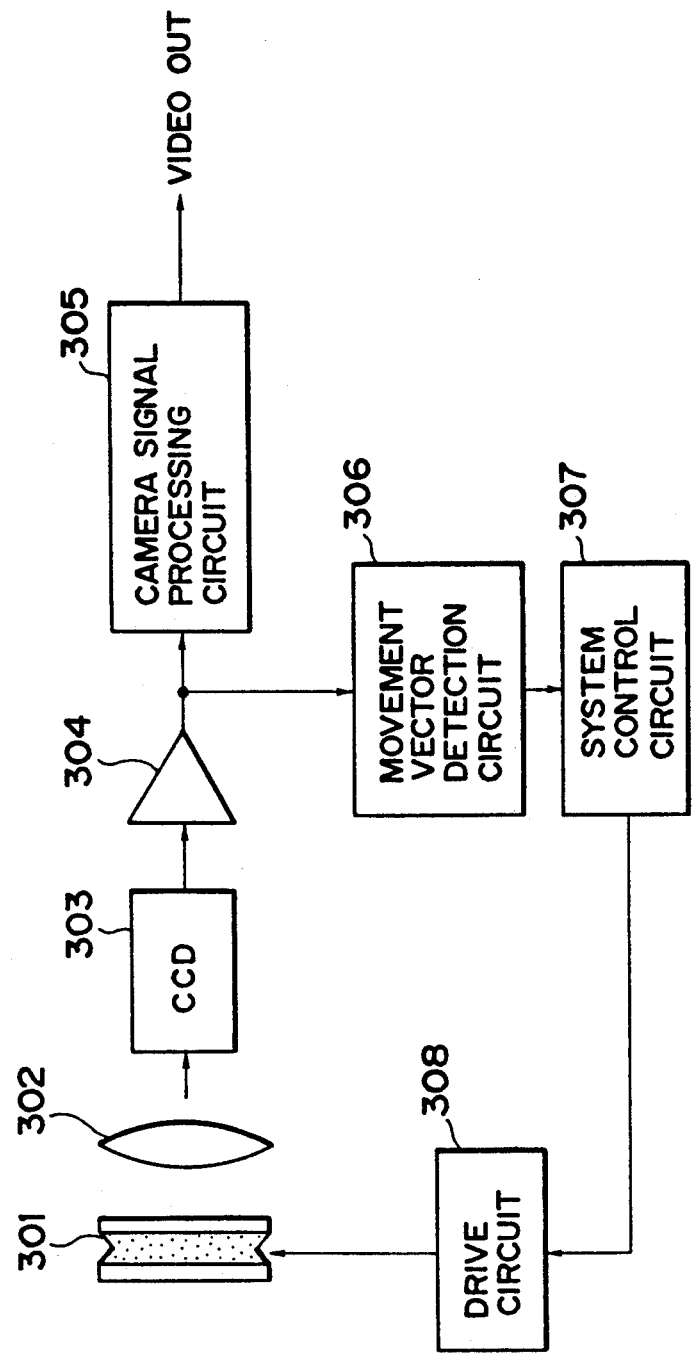
Figure 13:
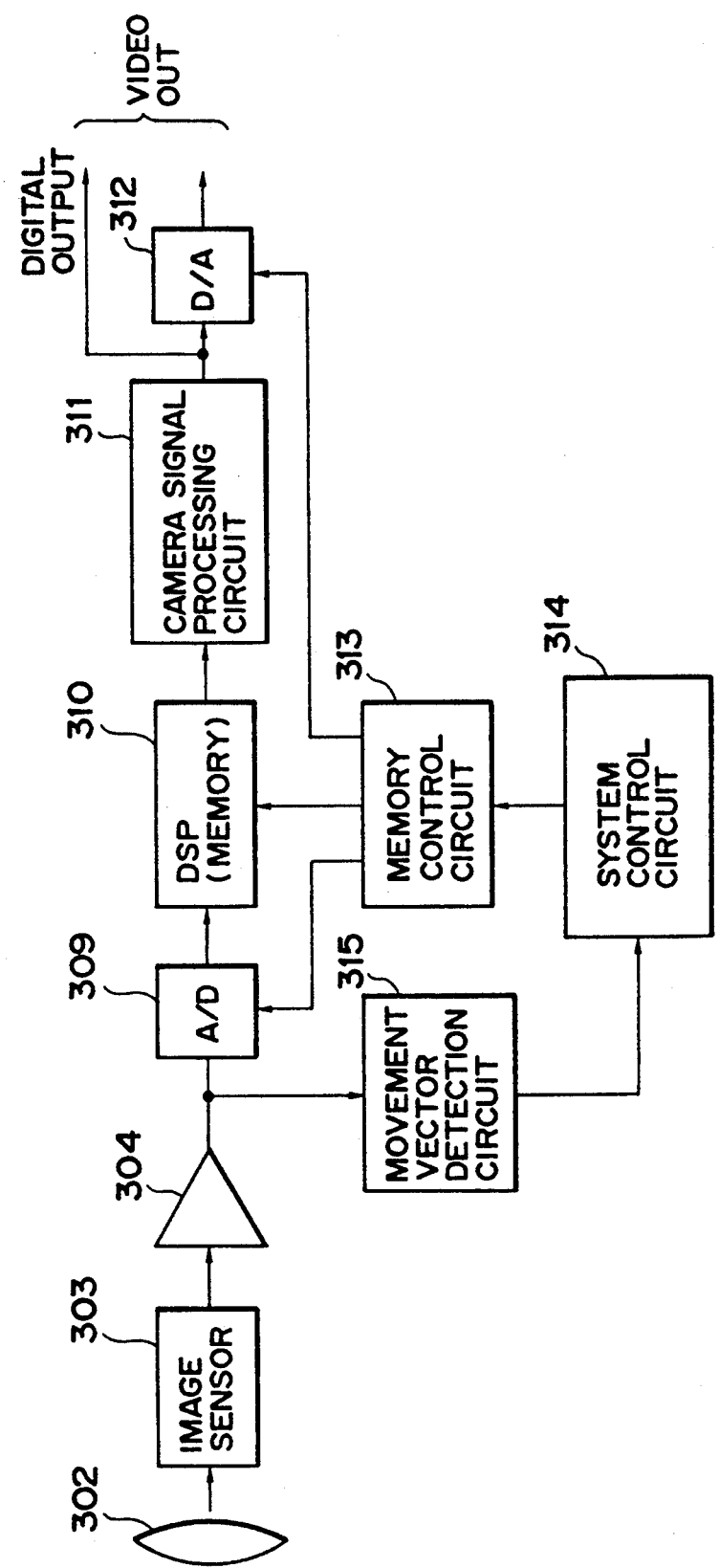

FIGS. 12 and 13 illustrate embodiments in which the above-described movement vector detection circuit is actually applied to a shake compensation device (vibration isolating device) for a video camera.

FIG. 12 illustrates a structure arranged in such a manner that a variable apex-angle prism is employed as the shake compensation means, the variable apex-angle prism being arranged in such a manner that the optical axis of an imaging lens is arranged to be variable so as to optically compensate the shake. Referring to FIG. 12, reference numeral 301 represents a variable apex-angle prism arranged in such a manner that the direction of the optical axis of its imaging lens optical system, that is, the apex angle, the variable apex-angle prism being manufactured by injecting silicon type liquid between two parallel glass plates. Reference numeral 302 represents an imaging lens and 303 represents an imaging element such as a CCD for transmitting a signal denoting the result of imaging by photoelectrically converting the subject image imaged by the imaging lens 302. Reference numeral 304 represents a pre-amplifier and 305 represents a camera signal processing circuit for transmitting a standardized video signal by subjecting the signal denoting the result of imaging and transmitted from the imaging element to a variety of processes such as a blanking process, a process of adding a synchronizing signal and a $\gamma$-correction process. Reference numeral 306 represents the movement vector detection circuit described in the above-described embodiments. Reference numeral 307 represents a system control circuit for calculating information about the direction of the operation of the variable apex-angle prism which fetches in information about the image movement vector supplied from the movement vector detection circuit 306 so as to compensate the image movement due to the shake of the camera, the system control circuit 307 further calculating the amount of its action. Reference numeral 308 represents a drive circuit for driving the variable apex-angle prism 301 in accordance with information calculated by the system control circuit 307.

As a result, the movement vector due to the image shape (camera shake) can be detected by the movement vector detection circuit 306 according to each of the above-described embodiments. Then, the direction and amount of the movement of the variable apex-angle prism can be calculated in accordance with the movement vector thus detected so that the variable apex-angle prism is driven, whereby the shake can be corrected.

Since the operation of the movement vector detection circuit is the same as that according to each of the above-described embodiments, its description if omitted here.

FIG. 13 illustrates a structure arranged in such a manner that no optical system is used in the shake compensating means, the image is temporarily fetched in a memory and the read region from the memory can be changed whereby the movement of the image can be compensated.

The same elements as those according to the embodiment shown in FIG. 12 are given the same reference numerals and their descriptions are omitted here.

An image signal transmitted from the preamplifier 304 is converted into a digital signal by an A/D converter 309 before it is received by a memory in a digital signal processing circuit 310. The rate and the timing of the A/D conversion performed for the purpose of making the image to be received by the memory and the writing timing and address are controlled by a memory control circuit 313. Also the reading address from the memory and the timing control are controlled by the memory control circuit 313.

A digital image signal read from the memory 310 is subjected to a variety of camera signal processes in the camera signal processing circuit 311. Then, it is converted into an analog signal by a D/A conversion circuit 312 so as to be transmitted as a video signal. It may be transmitted as it is in the form of the digital image signal.

In a movement vector detection circuit 315, the movement vector due to the camera shake is detected similarly to the above-described embodiment shown in FIG. 1, the detected movement vector being then supplied to the system control circuit 314. In the system control circuit 314, the direction and amount of the movement of the image are calculated in accordance with the movement vector detected by the movement vector detection circuit 315. As a result, the system control circuit 314 controls the memory control circuit 313 in accordance with the result of the calculations so as to control the memory read range. That is, the image is fetched by the memory at an angle of view wider than an angle of view which is previously transmitted and the read angle is changed at the time of reading the memory so that the movement is compensated. By shifting the read range to the direction of the movement, the movement of the image can be compensated.

The above-described structure may be modified in such a manner that the camera signal processing circuit is disposed behind the D/A converter 312 so as to perform the analog signal processing. However, the process can easily be completed by performing the digital signal process and an advantage is obtained in terms of noise elimination.

As described above, the shake occurring in a video camera can be compensated by the movement vector detection circuit according to the present invention. Furthermore, the present invention can be widely applied to, for example, panning motion in a camera as well as the shake compensation as a movement detection means.

As a result, a video camera possessing a shake compensating function possessing an extremely wide movement detection range, capable of performing the detection compensation of various movements regardless of the extent and exhibiting satisfactorily performance can be realized.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

I claim:

1. A movement vector detection device for detecting a movement vector of an image signal output from image sensing means based on a spatial inclination in a frame detected in the image signal, said movement vector detection device comprising:

(A) first operation means for receiving the image signal output from the image sensing means and for determining the movement vector by detecting the spatial inclination in the frame detected in the image signal, said first operation means outputting a movement vector signal;

(B) second operation means for detecting a spatial inclination component in a diagonal direction of the image signal and for outputting a diagonal inclination signal;

(C) third operation means for weighted-averaging the movement vector signal output from said first operation means in accordance with the diagonal inclination signal output from said second operation means to generate a weighted-averaged movement vector; and (D) output means for outputting the weighted-averaged movement generated by said third operation means.

2. A movement vector detection device according to claim 1, wherein said first operation means further comprises density difference detection means for detecting the density difference between a plurality of frames wherein the movement vector is obtained by operating the output from said density difference detection means and the spatial inclination.

3. A movement vector detection device according to claim 1, wherein said first operation means determines said movement vector in accordance with an approximation operation expression formed by estimating the influence of the diagonal spatial inclination of said image signal.

4. A movement vector detection device according to claim 3, wherein said third operation means averages a plurality of movement vectors determined by said first operation means by weighting them in accordance with the degree of spatial inclinations detected by said second operation means so that the influence of a particular movement vector on the average is reduced in proportion to the degree of that movement vector's spatial inclination.

5. A movement vector detection device according to claim 4, wherein said third operation means sequentially arranges a plurality of movement vectors determined by said first operation means for respective movement vectors in accordance with the degree of spatial inclinations detected by said second operation means and sequentially changes the weight and the amount so that the movement vectors are averaged.

6. A movement vector detection device according to claim 3, wherein said third operation means weights a plurality of movement vectors determined by said first operation means in accordance with their diagonal inclination components by multiplying them by the inverse numbers of the corresponding outputs from said second operation means.

7. A movement vector detection device for detecting a movement vector of an image signal output from image sensing means by detecting the spatial inclination in a frame of the image signal comprising detected blocks, said movement vector detection device comprising:

(A) movement vector operation means for receiving the image signal output from the image sensing means and for detecting, from the image signal, the spatial inclination in the frame and the time spatial inclination between frames to determine the movement vectors in each of the detected blocks in the frame, the blocks corresponding to portions of an image sensing plane of the image sensing means and said movement vector operation means transmitting movement vectors for each of the blocks;

(B) diagonal component operation means for detecting a spatial inclination component in a diagonal direction of the image signal for each of the blocks;

(C) averaging means for averaging the movement vectors from each of the blocks transmitted from said movement vector operation means by weighting them in accordance with the degree of diagonal spatial inclinations detected by said diagonal component detection means to generate a weighted-averaged movement vector, and;

(D) output means for outputting the weighted-averaged movement vector generated by said averaging means.

8. A movement vector detection device according to claim 7, wherein said movement vector operation means determines the movement vector in accordance with an approximation operation expression which has been formed by estimating the influence of the diagonal spatial inclination of the image signal.

9. A movement vector detection device according to claim 7, wherein said third operation means averages a plurality of movement vectors determined by said first operation means by weighing them in accordance with the degree of spatial inclinations detected by said second operation means so that he influence of a particular movement vector is reduced in proportion to the degree of that movement vector's spatial inclination.

10. A movement vector detection device for detecting an image movement amount of an image signal output from image sensing means based on spatial inclination in a frame detected in the image signal, said movement vector detection device comprising:
   (A) filter means for band-limiting a spatial inclination component in a diagonal direction of the image signal and for outputting a diagonal spatial inclination component;
   (B) operation means for receiving the image signal from the image sensing means and for determining the movement vector based on information indicating the spatial inclination in the frame and timer spatial inclination between frames detected from the image signal in accordance with an approximation operation expression formed by estimating the influence of the diagonal spatial inclination component output from said filter means; and
   (C) output means for outputting the movement vector determined by said operation means.

11. A movement vector detection device according to claim 10, wherein said filter means comprises a two-dimensional cross filter which transmits only horizontal and vertical frequency components of the image signal and stops a diagonal component.

12. A movement vector detection device according to claim 11 further comprising a two-dimensional Fourier transformation circuit and a two-dimensional Fourier inverse transformation circuit disposed across said filter means.

13. A movement vector detection device according to claim 12, wherein said filter means transmits only horizontal and vertical spatial regions of the image signal and stops a diagonal component, said filter means comprising a plurality of delay circuits, a band pass filter and an addition circuit for adding signals while weighting the signals with a predetermined weight.

14. A movement vector detection device according to claim 10, wherein said filter means limits the bend of the diagonal spatial inclination component by performing a mask convolution operation of the image signal in a spatial region.

15. A movement vector detection device for detecting a movement amount of an image signal output from image sensing means based on a spatial inclination in a frame of the image signal, said movement vector detection device comprising:
   (A) first operation means for receiving the image signal from the image sensing means and for determining a movement vector for each of predetermined blocks in the frame, the blocks corresponding to portions on an image sensing plane of the image sensing means, by using a spatial inclination component in said frame;
   (B) second operation means for detecting a diagonal spatial inclination component of the image signal for each of the blocks;
   (C) classifying means for classifying the blocks into patterns based on a result of the operation performed by said second operation means;
   (D) averaging means for averaging the movement vectors for the blocks by weighting the movement vectors in accordance with a classification to which the corresponding block belongs to generate an averaged movement vector; and
   (E) output means for outputting the averaged movement vector generated by said average means.

16. A movement vector detection device according to claim 15, wherein said first operation means further comprises density difference detection means for detecting the density difference between a plurality of frames, wherein said movement vector is obtained by operating the output from said density difference detection means and the spatial inclination.

17. A movement vector detection device according to claim 16, wherein said first operation means determines said movement vector in accordance with an approximation operation expression formed by estimating the influence of the diagonal spatial inclination of said image signal.

18. A movement vector detection device according to claim 17, wherein said classifying means classifies the blocks in accordance with a degree of the diagonal spatial inclination detected by said second operation means, said averaging means averages the blocks classified by said classifying means by weighting them in accordance with the degree of the diagonal spatial inclinations in such a manner that the weight is in inverse proportion to the diagonal spatial inclination and the influence of any particular movement vector on the average is reduced in proportion to the degree of that movement vector's spatial inclination component.

19. A movement vector detection device according to claim 15, wherein said classifying means performs said classification in such a manner that blocks in which the diagonal spatial inclination is larger than a predetermined threshold are omitted from the classifying operation and the diagonal spatial inclinations of only blocks diagonal spatial inclinations are in which the smaller than the threshold, are classified.

20. A movement vector detection device according to claim 19, wherein said classifying means comprises means for comparing an x-directional spatial inclination and a y-directional spatial inclination to weight the x-directional and y-directional evaluations.

21. An image deviation compensating device comprising:
   (A) image pickup means;
   (B) first operation means for operating a movement vector by detecting a spatial inclination in a frame from an image signal transmitted from said image pickup means and by using said spatial inclination;
   (C) second operation means for detecting a spatial inclination component in a diagonal direction of said image signal;
   (D) third operation means for averaging the output from said first operation means by weighting that output in accordance with the output from said second operation means; and
   (E) movement compensation means for compensating the movement of an image in accordance with the output from said third operations means.

22. An image deviation compensating device according to claim 21, wherein said compensation means comprises means for compensating the movement of the image by optically changing the optical axis of an incidental beam upon said image pickup means.

23. An image deviation compensating device according to claim 22, wherein said movement compensating means comprises a variable-apex prism.

24. An image deviation compensating device according to claim 21 further comprising storage means for storing image signals transmitted from said image pickup means for one frame, said compensation means comprising means for changing an address of reading a stored image from said storage means in accordance with said movement vector transmitted from said third operation means, the address being changed in a direction in which the movement of said image is compensated.

25. An image deviation compensating device comprising:
(A) image pickup means;
(B) filter means for band-limiting of a spatial inclination component of an image signal transmitted from said image pickup means in a diagonal direction of an image;
(C) operation means for operating a movement vector from the image signal in accordance with an approximation operation expression formed by estimating the influence of a diagonal spatial inclination component from the output from said filter means; and
(D) movement compensation means for compensating the movement of an image in accordance with the movement vector transmitted from said operation means.

26. An image deviation compensating device according to claim 25, wherein said compensation means comprises means for compensating the movement of the image by optically changing the optical axis of an incidental beam upon said image pickup means.

27. An image deviation compensating device according to claim 26 further comprising storage means for storing image signals transmitted from said image pickup means for one frame, said compensation means comprising means for changing an address of reading a stored image from said storage means in accordance with the movement vector transmitted from said operation means, the address being changed in a direction in which the movement of the image is compensated.

28. An image deviation compensating device comprising:
(A) image pickup means for providing an image signal corresponding to an image;
(B) first operation means for obtaining the spatial inclination component in a frame from the image signal provided from said image pickup means, the frame comprising predetermined blocks, and for operating a movement vector in each of the predetermined blocks in the frame in accordance with the spatial inclination component;
(C) second operation means for detecting the spatial inclination component in a diagonal direction of the image from the image signal;
(D) classifying means for classifying each of the blocks into predetermined patterns in accordance with the result of the detection by said second operation means;
(E) averaging means for averaging the movement vector of each of the blocks calculated by said first operation means in accordance with a classification made by said classifying means while weighting the movement vectors by a predetermined weight; and
(F) movement compensating means for compensating the movement of the image in accordance with the movement vector averaged by said averaging means.

29. An image deviation compensating device according to claim 28, wherein said compensation means comprises means for compensating the movement of the image by optically changing the optical axis of an incidental beam upon said image pickup means.

30. An image deviation compensating device according to claim 28 further comprising storage means for storing image signals transmitted from said image pickup means for one frame, said compensation means comprising means for changing an address of reading a stored image from said storage means in accordance with the movement vector transmitted from said operation means, the address being changed in a direction in which the movement of the image is compensated.

* * * * *

UNITED STATES PATENT AND TRADEMARK OFFICE
CERTIFICATE OF CORRECTION

PATENT NO. : 5,296,925
DATED : March 22, 1994
INVENTOR(S) : TOSHIAKI KONDO, ET AL.

It is certified that error appears in the above-indentified patent and that said Letters Patent is hereby corrected as shown below:

ON THE COVER PAGE:

[56] References Cited

U.S. PATENT DOCUMENTS

Insert the following:

--4,218,703   8/1980   Netravali et al. ..... 358/136
  4,766,490   8/1988   Haghiri .............. 358,105--.

FOREIGN PATENT DOCUMENTS

Insert the following:

--2165417    4/1986    Great Britain
  0224957    6/1987    European Patent Office
  0348207   12/1989    European Patent Office
  0358196    3/1990    European Patent Office
  0177763    4/1986    European Patent Office
  0079195   11/1982    European Patent Office--.

COLUMN 1

Line 25, "B" should read --ß--.

UNITED STATES PATENT AND TRADEMARK OFFICE
CERTIFICATE OF CORRECTION

PATENT NO. : 5,296,925
DATED : March 22, 1994
INVENTOR(S) : TOSHIAKI KONDO, ET AL Page 2 of 4

It is certified that error appears in the above-indentified patent and that said Letters Patent is hereby corrected as shown below:

COLUMN 3

Line 31, "illustrate" should read --illustrates--.

COLUMN 6

Line 5, "$\Sigma_B g_x' \cdot g_y'$" should read --$\Sigma_B g_x' \cdot g_y'$,--.
Line 58, "$\alpha =$" should read --$\bar{\alpha} =$--.
Line 60, "sum where" should read --sum which is the absolute value-- and "is the absolute value which is" should read --of--.
Line 64, "vided" should read --vided as--.

COLUMN 7

Line 19, "values," should read --value,--.

COLUMN 8

Line 36, "passages" should read --passages.--.

COLUMN 10

Line 20, "circuits" should read --circuit--.

COLUMN 11

Line 5, "made" should read --made to--.

UNITED STATES PATENT AND TRADEMARK OFFICE
CERTIFICATE OF CORRECTION

PATENT NO. : 5,296,925
DATED : March 22, 1994
INVENTOR(S) : TOSHIAKI KONDO, ET AL.

It is certified that error appears in the above-indentified patent and that said Letters Patent is hereby corrected as shown below:

COLUMN 15

Line 1, "$|\Sigma_B g_x'/\Sigma_B g_y'|$" should read --$|\Sigma_B g_x'/\Sigma_B g_y'|$.--.
Line 22, "resuls" should read --results--.
Line 45, "can accurate" should read --can be accurately--.

COLUMN 16

Line 10, "in" should be deleted.

COLUMN 17

Line 35, "I claim:" should read --We claim:--.

COLUMN 18

Line 17, "for respective movement" should be deleted.
Line 18, "vectors" should be deleted.
Line 20, "means" should read --means for respective movement vectors--.
Line 67, "weighing" should read --weighting--.

COLUMN 19

Line 1, "he" should read --the--.

UNITED STATES PATENT AND TRADEMARK OFFICE
CERTIFICATE OF CORRECTION

PATENT NO. : 5,296,925
DATED : March 22, 1994
INVENTOR(S) : TOSHIAKI KONDO, ET AL.

It is certified that error appears in the above-indentified patent and that said Letters Patent is hereby corrected as shown below:

COLUMN 20

Line 33, "blocks" should read --blocks in which the--.
Line 34, "in which the" should be deleted.
Line 57, "operations" should read --operation--.
Line 67, "claim 21" should read --claim 21,--.

COLUMN 21

Line 31, "claim 26" should read --claim 26,--.

COLUMN 22

Line 32, "claim 28" should read --claim 28,--.

Signed and Sealed this

Third Day of January, 1995

Attest:

BRUCE LEHMAN

*Attesting Officer*   *Commissioner of Patents and Trademarks*